May 13, 1952  M. V. GROVES  2,596,238
FLUID POWER ACTUATOR
Filed Dec. 21, 1948  2 SHEETS—SHEET 1

INVENTOR.
MARTIN V. GROVES,
BY Ward, Crosby & Neal
ATTORNEYS.

May 13, 1952 M. V. GROVES 2,596,238
FLUID POWER ACTUATOR
Filed Dec. 21, 1948 2 SHEETS—SHEET 2
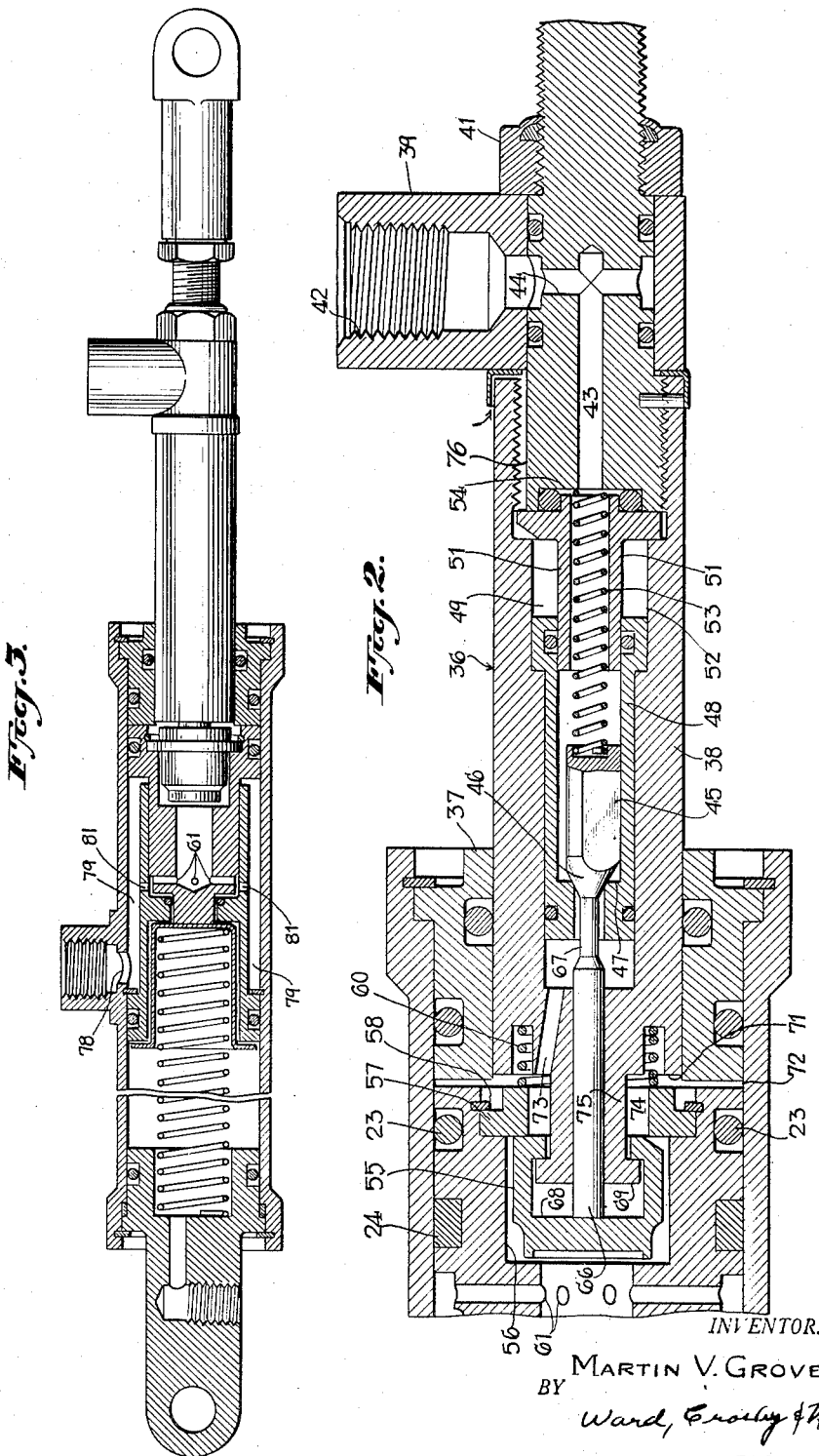
INVENTOR.
MARTIN V. GROVES.
BY Ward, Crosby & Neal
ATTORNEYS.

Patented May 13, 1952

2,596,238

UNITED STATES PATENT OFFICE 2,596,238

FLUID POWER ACTUATOR

Martin V. Groves, New Rochelle, N. Y., assignor of one-half to Arthur Wilde and Arthur Hull-Ryde, both of Bayside, N. Y., jointly Application December 21, 1948, Serial No. 66,466

7 Claims. (Cl. 60—54.6)

This invention relates to actuators for fluid pressure systems utilizing a supplemental fluid under pressure, such systems being particularly useful with the braking mechanisms of aircraft and automotive land vehicles.

In my patents, Numbers 2,179,241, issued on November 7, 1939, for "Compound Hydraulic Brake Pump," and 2,343,900, issued on March 14, 1944, for "Compound Hydraulic Brake Compressor," I have discussed certain hydraulic actuating mechanisms of the type in which the manual actuation first supplies a large volume displacement and thereafter, a relatively low volume displacement which creates a hydraulic advantage due to the difference in ratio between the low pressure and high pressure pistons. In certain installations, however, such for example, as aircraft, it is possible to utilize the supplemental pressure fluid lines available, such pressure fluid lines being either of the hydraulic or pneumatic type. These supplemental high pressure systems have heretofore been utilized in the actuation of aircraft brakes but such use has not been entirely satisfactory for the reason that there is no satisfactory "feel", i. e., when the manually controlled part, such as the brake pedal, is moved to an operative position by the pilot, there is no responsive action thereon to indicate to the pilot the operative position of the brake, such that there is great difficulty in properly metering the fluid supply from the supplemental pressure fluid source. Furthermore, devices hitherto known or used for this purpose or in this connection make no provision for limiting the pressure applied to the brakes, such that, in certain instances, the manual exertion of pressure on the brake pedal will cause the output pressure of the actuating mechanism to reach a value sufficient to overstress the brakes.

It is, therefore, an object of the present invention to provide a new and improved actuator utilizing a supplemental pressure fluid under the direct manual control of an operator.

Another object is the provision of a new and improved actuator of the above-described character, in which the output pressure thereof may be limited to substantially a predetermined value.

A further object of the invention is to provide a new and improved actuator for fluid pressure systems utilizing a supplemental fluid under pressure which is simple in construction, economical to manufacture and reliable in use.

The invention consists in the novel features, arrangements and combination of parts embodied by way of example in the apparatus hereinafter described as illustrating by way of example the preferred form of the invention and the invention will be more particularly pointed out in the claims appended hereto.

Further objects, features and advantages of the invention will more clearly appear from the detailed description given below and taken in connection with the accompanying drawings which form a part of the specification.

Referring to the drawings:

Fig. 2 is a view similar to that of Fig. 1, showing the actuator in longitudinal cross section and slightly enlarged; and Fig. 3 is a longitudinal cross sectional view partly in elevation of a hydraulic actuator employed with a hydraulic pressure system.

Figure 1:
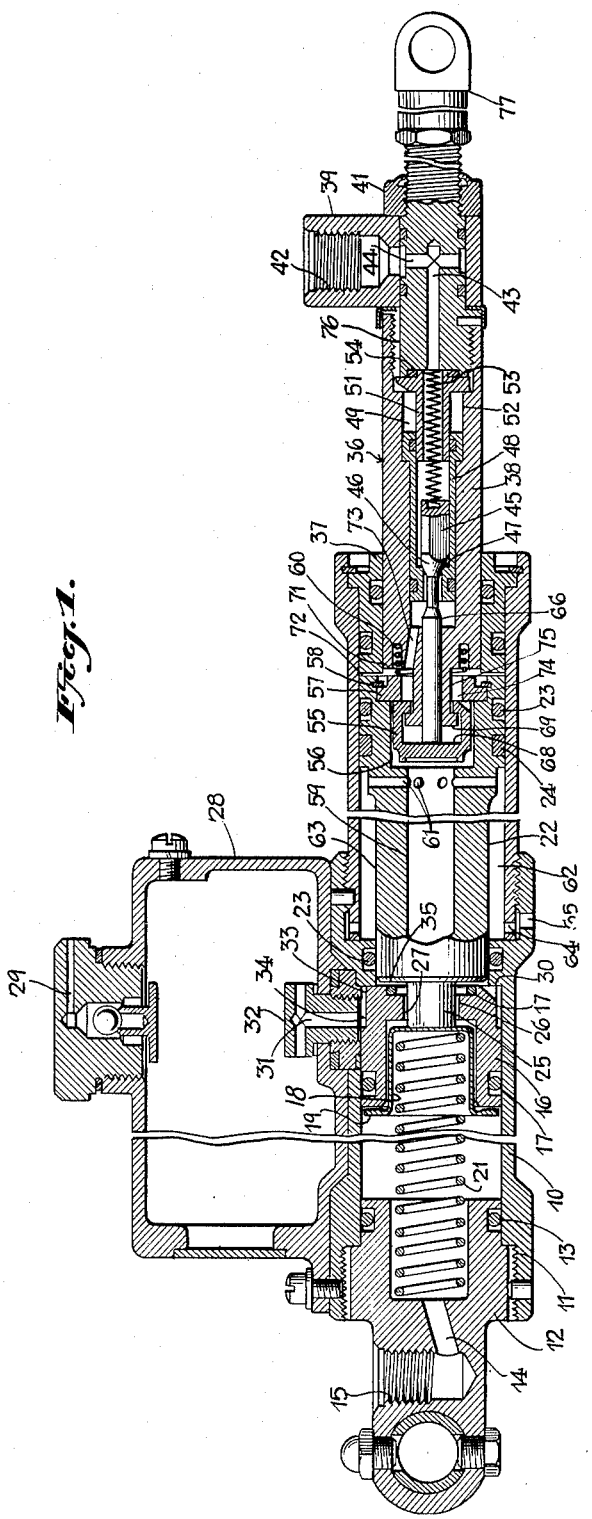
Fig. 1 is a longitudinal cross sectional view of a pneumatic actuator for a hydraulic pressure system according to the preferred embodiment thereof.

Referring now to the drawings and more particularly to Figs. 1 and 2 thereof, 10 designates a cylinder which, in the present embodiment, is composed of two parts conveniently joined together as by the threads 11. The forward end of the cylinder 10 is adapted to receive in threaded engagement the fitting 12 which comprises a packing ring 13. The fitting 12 is provided with a passageway 14 and threaded bore 15 which together serve as an outlet for the cylinder 10 which conveniently may be secured, for example, to flexible tubing leading to brake cylinders.

A substantially cup-shaped primary piston 16 is slidably disposed within and adapted to co-operate with the cylinder 10 and comprises packing rings 17. A cup-shaped member 18 is disposed within the piston 16 and is provided with a plurality of indentations 19 disposed about the periphery of the flange portion of the cup member at spaced intervals therealong, the cup member together with the indentations thereon being adapted to siphon off any air which may become trapped within the cylinder between the piston 16 and fitting 12 when the cylinder is mounted in a horizontal position. A helical spring 21 is arranged within the cylinder 10 with its forward end seated on the fitting 12 and the rearward end seated on the cup member 18 whereby the piston 16 is normally yieldably maintained in an inoperative position.

A booster piston 22 is slidably disposed within the cylinder 10 rearwardly of the primary piston 16 and comprises packing rings 23 and a suitable felt ring 24. The booster piston 22 has a reduced end portion 25 formed integrally therewith and adapted to pass through a central bore 26 in the primary piston 16 to engage the cup member 18.

It will be noted that the reduced end portion 25 of the booster piston is of slightly smaller diameter than the central bore 26 of the primary piston, such that an annular passage 27 is provided therebetween, which passage is in communication with that portion of the cylinder 10 defined by the primary piston and the fitting 12 by reason of the fact that the cup member 18 is spaced inwardly from both the cylinder 10 and the interior of the primary piston.

A suitable oil reservoir 28 is secured to the cylinder 10 in any suitable manner and may be charged with oil by removing the cap filler 29. The oil from the interior of the reservoir may be communicated to the annular passage 27 through a bore 31 in the attaching screw 32, through the annular passage 33 provided between the reduced portion 34 of the primary piston and the cylinder 10, the oil then flowing through the space normally provided between the shoulder 35 of the booster piston and the rearward end of the primary piston to the annular passage 27. When the booster piston is in the retracted position, the primary piston is held forward by a shoulder 30 in cylinder 10.

An actuating shaft assembly generally designated as 36 is secured to the rearward end of the cylinder 10 by means of an end bearing 37, the shaft assembly being slidably disposed within the end bearing. This shaft assembly comprises a slidable plunger or piston 38 comprising several individual parts hereinafter to be described. An inlet fitting 39 is carried by the piston or plunger 38 and secured thereon by means of a suitable locking nut 41. The inlet fitting 39 is provided with a central threaded bore 42 which communicates with an axial bore 43 in the plunger 38 by way of a vertical passageway 44 in the plunger. The inlet fitting 39 is adapted to be connected to a supplemental source of pneumatic pressure whereby the pressure may be transmitted from the source through the fitting and into the axial bore 43 in the plunger 38. A needle valve 45 is slidably disposed within the axial bore 43 and is provided with a conical portion 46 adapted to seat on a shoulder 47 of a limiting valve 48 also slidably disposed within the axial bore, the rearward end of the limiting valve being adapted to slide within an annular passage 49 formed between a cylinder 51 formed integrally with the plunger and the enlarged portion 52 of the bore 43. The conical portion 46 of the needle valve 45 is normally maintained seated on the shoulder 47 of the limiting valve 48 by means of a helical spring 53 disposed between the rearward end of the needle valve and shoulder 54 provided in the plunger 38.

The forwardmost end of the plunger or piston 38 is adapted to receive an exhaust valve 55 which extends into a hollow portion 56 in the rearward end of the booster piston and comprises a retaining ring 57 and retaining washer 58. It will be noted that the booster piston is provided with an axial bore 59 which is in communication with atmosphere through a plurality of radial openings 61, the annular passage 62 provided between the cylinder 10 and a reduced portion 63 of the booster piston, and passages 64 and 65 in the cylinder. A valve plunger 66 is carried by the plunger 38 and has a reduced end portion 67 normally disposed for engagement with the end face of the conical portion 46 of the needle valve. It will be noted that the exhaust valve 55 is substantially cup-shaped so as to form a chamber 68 and that the most forward flanged end 69 of the plunger 38 is adapted to slide within the chamber 68, the diameter of the forward end 69 being slightly smaller than the inside diameter of the exhaust valve. The flanged end 69 is assembled within the valve 55 by being inserted through an opening in the side wall of the valve before the plunger and valves are disposed in the position shown in Figs. 1 and 2. The valve plunger 66 is of such length that when the parts are in the position shown in Figs. 1 and 2 there is about .005″ clearance between the end of valve 46 and the adjacent end 67 of the plunger 66 when the opposite or forward end of the plunger 66 engages the inner surface of the valve 55, i. e., .005″ axial movement of the plunger 66 is provided to assure seating of the valve 46 on shoulder 47.

When the plunger 38 is secured within the cylinder 10, the forward portion 71 thereof is spaced apart from the rearward end of the booster piston, thereby forming a chamber 72 therebetween which is in communication with the axial bore 43 of the plunger by means of a passageway 73. The pressure within chamber 72 is at atmosphere when the actuator is in an unoperated condition, atmospheric pressure being introduced therein as follows; through passages 64 and 65, annular passage 62, radial openings 61 in the booster piston, into axial bore 59 in the booster piston, around the exhaust valve 55, the external diameter of the exhaust valve being slightly smaller than the diameter of the hollow portion 56 in the booster piston, and thence through the annular passage 74 provided between the retaining ring 57 and reduced portion 75 of the plunger. It will also be noted that the annular passage 49, in which the rearward end of the limiting valve is adapted to slide, is also at atmospheric pressure by way of passageway 76 formed in the plunger 38.

The rearward end of the plunger is provided with a fitting 77 which may be connected, for example, to the brake pedal by means of suitable linkage devices whereby the plunger may be moved forwardly in accordance with the pressure exerted manually on the brake pedal.

The operation of the pneumatic actuator shown in Fig. 1 will now be described. With the inlet fitting 39 connected to a suitable source of pneumatic pressure, the interior of the axial bore 43 and hence, the needle valve 45, are subjected to the pressure from this supplemental source, the value of which may be, for example, 1500 lbs. per square inch. However, the application of this supplemental pneumatic pressure within the bore 43 will not move the plunger 38 forward and with no manual pressure being exerted on the plunger, the various parts of the actuator heretofore described are maintained in their normal or unoperated position, as shown in Fig. 1. It should also be noted that chamber 72 intermediate the booster piston 22 and the plunger is at atmospheric pressure, as heretofore described, but this pressure alone is insufficient to move the booster piston forward. I have found that the use of a supplemental source of relatively high pressure, i. e. in the order of 1200 p. s. i. to 3000 p. s. i., for example, has two distinct advantages. First, the use of high values of supplemental pressure permits the construction of small cylinders which are neither bulky nor heavy. Further, air subjected to high pressure reacts in much the same manner as a liquid under pressure and provides a desirable cushioning effect in the operation of the actuator.

When the plunger 38 is moved forward manually as by the exertion of pressure on a brake pedal which may be transmitted through suitable linkage mechanism to the fitting 77, the exhaust valve 55 is carried forward with the plunger 38, under the influence of spring 53 (Fig. 2) which by means of the needle valve 45 and plunger 66 causes the valve 55 to be seated against the booster piston within the hollow portion 56 thereof, thereby to seal off from atmosphere chamber 72. Continued forward movement of the plunger 38, after the valve 55 has been rested, causes the plunger 66 to unseat the conical portion 46 of needle valve 45 from the shoulder 47, thus commencing the opening of the limit valve. When this occurs, the pneumatic pressure from the supplemental source is transmitted through passageway 73 and into chamber 72 to exert therein a driving force against the rearward end of the booster piston 22 (Fig. 2) sufficient to cause the booster piston to move forward. It will be noted that the diameter of the forward end portion 71 of the plunger 38 is smaller than the diameter of the booster piston, such that an advantage is provided therebetween resulting in the "feel" pressure on the head of plunger 38 is less than the actuating pressure exerted on the rear end of the booster piston 22. It has been found in practice that a ratio of 1:2 is satisfactory, giving a "feel" force of one-half the force exerted on the booster piston by the pneumatic pressure.

The needle valve 45 thus serves as a metering device for conveying the pneumatic pressure from the supplemental source into the chamber 72 to drive the booster piston forward and as the plunger 38 continues to move forward, a substantially greater amount of pneumatic pressure is exerted against the booster piston. As the booster piston initially moves forward, shoulder 35 thereof will engage the rearward end of the primary piston 16, thereby to seal off the communication between the annular passage 27 and the oil reservoir 28, such that any continued forward motion of the booster piston will cause the hydraulic fluid contained within the cylinder 10 forward of the primary piston to be driven through the passageway 14 and outlet 15, from which the oil may be directed into the several cylinders associated with the braking mechanisms respectively.

When the needle valve 45 is unseated from the shoulder 47 of the limiting valve, the pressure developed in chamber 72, which is supplied by the supplemental source, also exerts a force on the plunger 38 in a direction opposite to that caused by the manually forward movement thereof, such that a "feel" is produced at the forward portion 71 thereof, enabling the operator to maintain a sensitive control over the actuator, even though a high value of pneumatic pressure is being utilized from a supplemental source. It is to be noted also that the air furnished by the supplemental source is of a volume greater than that which could be displaced by the plunger 38; therefore, after the valve 45 has been opened to admit air pressure, further movement of the plunger 38 is merely a follow up movement serving to maintain the exhaust valve 55 closed and the valve 45 open. At any time that this follow up movement ceases the booster piston 22 will move away from the plunger 38 resulting in first closing the valve 45 and immediately thereafter opening the valve 55.

Should an operator exert so great a force on the brake pedal as to generate excessive output pressure, the high pressure thus exerted by the booster piston to drive the primary piston may cause the brakes of an aircraft or automotive land vehicle to become overstressed. However, by the inclusion of a limiting valve, this possibility is overcome. The shoulder 47 of the limiting valve is subjected to the pressure from the supplemental source and is of a smaller diameter than the forward end thereof, such that a pressure value in chamber 72 of approximately 900 lbs. per square inch is sufficient to drive the limiting valve rearwardly to close the needle valve. When this occurs, no further pressure from the supplemental source may be exerted against the booster piston and a continued forward movement of the plunger 38 will cause it to seat against the rearward end of the booster piston to produce a direct drive between the plunger and booster piston of the ratio of one to one. The value of pressure at which the needle valve will be closed by the limiting valve may, of course, be varied by changing the relative difference in areas between the front end and shoulder 47 of the limiting valve, thereby making it possible to control or limit the maximum output pressure exerted by the primary piston 16.

When the plunger 38 is caused to move rearwardly under pressure supplied by a retracting spring 60, as when the operator releases the brake pedal, the exhaust valve 55 is disengaged from the hollow portion 56 of the booster piston, thus allowing the air pressure in chamber 72 to escape to atmosphere through the bore 59 and openings 61 in the booster piston. This reduction in pressure in chamber 72 is sufficient to cause the needle valve 45 to move forward under pressure of the helical spring 53 and become seated against the shoulder 47 of the limiting valve, assuming, of course, that the limiting valve has not been previously caused to close the needle valve. If the limiting valve has been caused to close the needle valve, the opening of chamber 72 to atmosphere allows the air pressure from the supplemental source to drive the needle and limiting valves forward to their normally unoperated positions.

As pointed out hereinabove, the supplemental source of fluid pressure may be either pneumatic pressure or hydraulic pressure. The embodiment shown and described in connection with Fig. 1 is adapted to utilize a supplemental source of pneumatic pressure in driving the booster piston. However, a supplemental source of hydraulic pressure may also be utilized to drive the booster piston and, in such case, it is necessary that the oil contained in chamber 72 be fed from the supplemental source into the reservoir 28 when the plunger is caused to move rearwardly as the operator releases the brake pedal. This conveniently may be accomplished by the structure shown in Fig. 3 wherein 78 designates an opening in the cylinder 10 whereby the annular passage 79 formed by the reduced portions of the primary and booster pistons are in communication with the reservoir 28. Further, the radial openings 61 in the booster piston are formed in the forward end thereof rather than in the rearward end, as described heretofore, and are in communication with the annular passage 79 by way of openings 81. Thus, when a supplemental source of hydraulic pressure is employed, the oil from chamber 72 will pass through the radial openings 61, annular passage 79, and opening 78 into the reservoir when the exhaust valve is disengaged from the hollow portion of the booster piston.

Having thus described my invention with par- ticular reference to the preferred forms thereof, it will be obvious to those skilled in the art after understanding the invention that various changes and other modifications may be made therein without departing from the spirit and scope thereof as defined by the claims appended hereto.

What I claim as new and desire to be secured by Letters Patent of the United States is:

1. In a fluid power actuator, the combination of a cylinder, a pair of pistons arranged in tandem within said cylinder and spaced apart to form a chamber therebetween, manually operable means for moving one of said pistons toward the other, conduit means for connecting said chamber to a source of pressure fluid, a normally closed inlet valve disposed within said conduit means for controlling the flow of fluid from said source to said chamber, second valve means for controlling the opening and closing of said chamber, said valve being carried by said one of said pistons and movable thereby, said valve being urged to closed position by fluid in said chamber, and means interposed between said valves for opening said inlet valve when said one of the said pistons has been moved manually beyond a predetermined distance.

2. In a pneumatic power actuator, the combination of a cylinder, a piston operatively disposed within said cylinder, actuating means slidably disposed within said cylinder and spaced apart from said piston to form a chamber therebetween, said piston and said cylinder being provided with openings to subject said chamber to atmospheric pressure, first valve means carried by said actuating means and movable with and with respect to said piston and adapted to seal off said chamber from atmosphere when the actuating means has been moved a predetermined distance, said actuating means being provided with an opening therein to connect said chamber to a source of pneumatic pressure, and normally closed second valve means disposed within said opening in the actuating means and adapted to convey air under pressure from the source to said chamber after the actuating means has been moved beyond said predetermined distance, said valve means being movable to open and closed positions by said actuating means and being urged to closed position by pneumatic pressure in said chamber.

3. In a pneumatic power actuator, the combination of a cylinder, a primary piston operatively disposed within said cylinder to provide a primary chamber ahead of said piston, a booster piston operatively disposed within said cylinder rearwardly of said primary piston and adapted upon application thereto of pressure to drive the primary piston, an actuating shaft slidably disposed within said cylinder rearwardly of said booster piston to form a pressure chamber between the booster piston and the actuating shaft which is open to atmosphere, means for maintaining a fluid seal between said primary chamber and said pressure chamber at all times, an exhaust valve carried by said actuating shaft and adapted to cooperate with said booster piston to seal off said chamber from atmosphere, said actuating shaft being provided with an opening therein to connect said chamber to a source of pneumatic pressure, a normally closed inlet valve slidably arranged within said opening in the actuating shaft for sealing off said chamber from said source of pneumatic pressure, and a valve plunger carried by the actuating shaft for opening gradually said inlet valve when the actuating shaft is moved beyond a predetermined distance, thereby causing the pressure from said source to be exerted in the chamber against said booster piston to drive the booster piston.

4. In a fluid power actuator, the combination of a cylinder, a piston operatively disposed within said cylinder, actuating means slidably arranged within said cylinder and spaced rearwardly from said piston to form a chamber therebetween, conduit means including an axial bore in said actuating means for connecting said chamber to a source of pressure fluid, and normally closed valve means including a limiting valve provided with a valve seat slidably disposed in said bore and carried by said actuating means, said valve means also including a needle valve normally urged forwardly against said seat and yieldably urging said seat forwardly relative to said actuating member, means for moving said needle off said seat when said actuating means has been moved a predetermined distance and said limiting valve being movable rearwardly to seal off said chamber from the source of pressure fluid when the pressure in the chamber reaches a predetermined value.

5. In a liquid power actuator, the combination comprising a cylinder, a piston operatively disposed within said cylinder, a plunger slidably disposed within said cylinder rearwardly of said piston thereby forming a chamber therebetween, manually operable means for moving said plunger toward or away from said piston, conduit means including an axial bore in said plunger connecting said chamber to a source of pressure liquid, and valve means including a limiting valve provided with a valve seat slidably disposed in said bore and carried by said plunger, said valve means also including a needle valve normally urged forwardly against said seat and yieldably urging said limiting valve forwardly relative to said plunger, means for moving said needle off its seat for metering the flow of said pressure liquid into said chamber in accordance with the movement of said plunger toward said piston, said limiting valve being movable rearwardly toward said needle valve by pressure fluid within said pressure chamber for sealing off said chamber from said source of pressure liquid when the pressure within the chamber reaches a predetermined value.

6. A power actuator comprising the combination of a cylinder, a piston operatively disposed within said cylinder, a plunger within said cylinder rearwardly of said piston thereby forming a chamber therebetween, said piston having a bore in the rearward end thereof and a plurality of exhaust ports for said chamber extending from said bore to the exterior of said piston, an exhaust valve carried by said plunger and adapted to be seated within said bore to seal off said exhaust ports when the plunger has been moved a predetermined distance with respect to the piston, conduit means interconnecting said chamber and a source of fluid under pressure, and metering valve means within said conduit means for controlling the flow of fluid under pressure from the source into said chamber in response to movement of said plunger, said metering valve means comprising a needle valve carried by the plunger, a housing normally engaging said needle valve and movable with and with respect to the needle valve, and a rod member for disengaging said housing from said needle valve after said exhaust valve is seated within said bore, the disengagement of the needle valve and housing being effected gradually in accordance with the rate of movement of said plunger, thereby to meter the flow of fluid under pressure from the source to said chamber.

7. A power actuator comprising the combination of a cylinder, a piston operatively disposed within said cylinder, a plunger slidably arranged within said cylinder rearwardly of said piston to form a chamber therebetween, said piston having a hollowed portion in the rearward end thereof in communication with a plurality of exhaust ports therein, an exhaust valve carried by said plunger and adapted to be seated within the hollowed portion of said piston to seal off said chamber from the exhaust ports when the plunger has been moved a predetermined distance toward the piston, conduit means for connecting said chamber to a source of pneumatic pressure, a needle valve slidably arranged within said conduit means, a valve seat slidably arranged within said conduit means and normally engaging said needle valve, and means interposed between said exhaust and needle valves for disengaging the latter from said valve seat gradually upon continued inward movement of the plunger after the exhaust valve is seated within the hollowed portion of the piston, whereby the flow of air under pressure from the source to said chamber to drive said piston is controlled by the movement of the plunger, the forward end of said valve seat being subjected to the pressure in said chamber, the rear end of the valve seat being smaller than the forward end thereof and being subjected to the pressure of the fluid from said source, whereby the valve seat is caused to engage the needle valve to seal off the chamber from the source when the pressure in the chamber reaches a predetermined value.

MARTIN V. GROVES.

REFERENCES CITED

The following references are of record in the file of this patent:

UNITED STATES PATENTS

| Number | Name | Date |
|---|---|---|
| 2,185,449 | Veenschoten | Jan. 2, 1940 |
| 2,410,269 | Chouings | Oct. 29, 1946 |
| 2,413,380 | Rush | Dec. 31, 1946 |
| 2,451,334 | Groves | Oct. 12, 1948 |